United States Patent [19]

Burgess et al.

[11] Patent Number: 4,960,846

[45] Date of Patent: Oct. 2, 1990

[54] POLYIMIDE COPOLYMERS CONTAINING 4,4'-BIS(P-AMINOPHENOXY)BIPHENYL AND SILOXANE DIAMINE MOIETIES

[75] Inventors: Marvin J. Burgess, Lisle; David A. Wargowski, Naperville; Agnes M. Palka, St. Charles, all of Ill.

[73] Assignee: Amoco Corporation, Chicago, Ill.

[21] Appl. No.: 491,436

[22] Filed: Mar. 9, 1990

[51] Int. Cl.$^5$ .............................................. C08G 77/04
[52] U.S. Cl. ........................................ 528/26; 528/28
[58] Field of Search .................................... 528/26, 28

[56] References Cited

U.S. PATENT DOCUMENTS

| | | | |
|---|---|---|---|
| 3,740,305 | 6/1973 | Hoback et al. | 161/183 |
| 4,395,527 | 7/1983 | Berger | 528/26 |
| 4,672,099 | 6/1987 | Kunimune et al. | 528/26 |
| 4,748,228 | 5/1988 | Shoji et al. | 528/26 |
| 4,829,131 | 5/1989 | Lee | 528/26 |
| 4,853,452 | 8/1989 | Lee | 528/26 |
| 4,861,855 | 8/1989 | Bockrath et al. | 528/125 |
| 4,880,895 | 11/1989 | Higashi et al. | 528/173 |

FOREIGN PATENT DOCUMENTS 0284803  10/1988  European Pat. Off. ............. 77/42

OTHER PUBLICATIONS

Lee, C. J., J. of Electronic Materials, vol. 18, No. 2 (1989).
Takeda et al., Proc. of 38th Electronics Components Conference, IEEE 420-424 (1988).
Davis et al., Recent Advances in Polyimide Science and Technology, Proc. 2nd Ellenville Conf. on Polyimides, 381-388 (1987).

*Primary Examiner*—Morton Foelak
*Attorney, Agent, or Firm*—Rae K. Stuhlmacher; William H. Magidson; Ralph C. Medhurst

[57] ABSTRACT

A low modulus, solvent resistant, wet etchable polyimide useful electronic applications as passivation and insulating coatings, said polyimides containing a 4,4'-bis(p-aminophenoxy)biphenyl moiety, a siloxane diamine moiety, and a dianhydride moiety.

10 Claims, No Drawings

POLYIMIDE COPOLYMERS CONTAINING 4,4'-BIS(P-AMINOPHENOXY)BIPHENYL AND SILOXANE DIAMINE MOIETIES

BACKGROUND OF THE INVENTION

This invention relates to polyimide copolymers and, more particularly, to low modulus, solvent resistant, wet-etchable, polyimides containing 4,4'-bis(p-aminophenoxy)biphenyl (APBP) and siloxane diamine moieties.

Aromatic polyimides and polyamide-imides have found extensive use in industry as fibers, composites, molded parts and dielectrics due to their toughness, flexibility, mechanical strength and high thermal stability. In the electronic industry, polyimides have proven to be useful due to their low dielectric constant and high electrical resistivity. Such polymers have been used as both films and coatings for insulation, die attach adhesives, flexible circuit substrates, and the like.

In particular, polyimides are useful for interlevel dielectric and passivation applications, for example, as a passivation coating over a substrate containing an integrated circuit. As a passivation coating, the polymer protects the integrated circuit against damage during assembly and provides stress relief between the pressure sensitive areas of a substrate, or an integrated circuit, and the packaging material which encapsulates the integrated circuit assembly. Further, the passivation coating acts as a barrier to ion transport between the outside environment and the integrated circuit and, when the integrated circuit is packaged in epoxy packaging materials, the passivation coating acts as a barrier to alpha particles emanating from the epoxy packaging material. The stress relief capability of a polymer (i.e., the pliability) may be measured as the modulus (also referred to as tensile modulus of the polymer. A low modulus polymer is preferred because a low modulus polymer will transmit less stress from the exterior of the package to the highly sensitive substrate than would be transmitted by a higher modulus polymer coating.

Siloxane diamine monomers have been used to lower the modulus of a polyimide. However, processing characteristics such as resistance to photoresist solvents and developing solutions are generally sacrificed. As is explained further below, polymers used for microelectronic applications must possess good processing characteristics.

Processing polyimides, for example, in the case of polyimide coated integrated circuits, requires a multi-step procedure. Polyimides are generally made by dissolving a diamine in a solvent and then adding a dianhydride to form a solution of polyamic acid. The resulting solution of polyamic acid is spread on a substrate to form a coating and heated (soft-baked) to remove the solvent. The polyamic acid coating is further coated with a photoresist material which itself is in a solvent, and that solvent is removed, typically by heating (also called soft-baking). The photoresist material is then shielded with a mask containing a pattern of openings, and the photoresist material is exposed to actinic radiation. Thus, the photoresist material is photochemically altered such that the areas that were exposed to actinic radiation change solubility, and vias (or openings) are created by taking advantage of this selective solubility to develop and remove specific areas of photoresist material The polyamic acid coating can then be etched either along with the development and removal of the photoresist material or through the vias created in the photoresist material. After the polyamic acid is etched, the unexposed photoresist is removed, and the remaining polyamic acid is imidized, generally by heating, to form the final passivation coating. The vias (or openings) through the polymer coating permit access for electrical connections between the substrate and the outside environment.

Accordingly, the polyamic acid must be resistant to the solvent used to apply and process the photoresist material. Preferably, the polyimide is also resistant to the solvents that are often used in post-imidization processing, for example, the use of N-methylpyrrolidone (NMP) to clean the finished integrated circuit. On the other hand, the polyamic acid should be soluble in the wet-etch solution.

European patent application 284,803 (Published 10/5/88) teaches the preparation of siloxane polymers for microelectronic applications. This patent discloses fully imidized polyimides which are based on oxydiphthalic anhydride, a difunctional siloxane monomer, and an organic diamine that provides an asymmetrical structure in the polyimide siloxane polymer chain. The polyimide form of the polymer is soluble in NMP. Solubility in NMP is not a desirable attribute for a polyimide because NMP is generally used for post imidization procedures.

Davis et al., Recent Advances in Polyimide Science and Technology, Proc. 2nd Ellenville Conf. on Polyimides, 381–388 (1987), teaches a propyltetramethyldisiloxane, 3,3',4,4'-benzophenonetetracarboxylic acid dianhydride (BTDA), 4,4'-methylenedianiline (MDA) polyimide. There is no teaching that the compositions disclosed in this reference have a low modulus, nor any suggestion that the incorporation of siloxane will provide a low modulus polyimide composition. Further, there is no teaching that the composition provides a polyamic acid that is resistant to the solvents used with the photoresist material or in the wet-etching process. Rather, this reference notes that care must be taken in removing the photoresist material since the disclosed polyamic acid is prone to crazing in conventional photoresist developers.

While these references disclose siloxane-containing polymers for microelectronic applications, they do not disclose the invented siloxane-containing polyimides or the combination of low modulus, solvent resistance, and wet-etchability that are provided by the present invention.

Accordingly, it is an object of the present invention to provide an improved polyimide composition for microelectronic applications. Another object of the present invention is to provide a polyimide composition which exhibits a low modulus. A further object of the present invention is to provide a polyimide composition which is wet-etchable and is resistant to solvents generally used for photoresist processing. A still further object of the present invention is to provide polyimide compositions having advantageous properties. These and other objects and advantages of the present invention will be apparent to those skilled in the art from the following description.

DESCRIPTION OF THE INVENTION

The objects of this invention can be attained by providing polyimide compositions comprising recurring units corresponding to Formula I

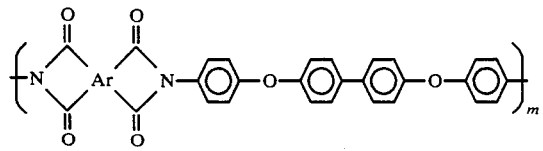

and

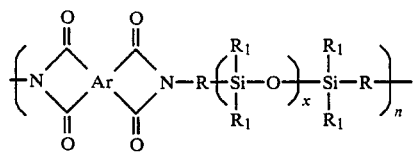

wherein Ar is at least one tetravalent aromatic nucleus; R is a divalent hydrocarbon radical; $R_1$ is a monovalent hydrocarbon radical; m and n are each at least one; and x is 1 to about 50.

In another aspect, the present invention includes the salts, carboxylic acids, or esters of Formula II

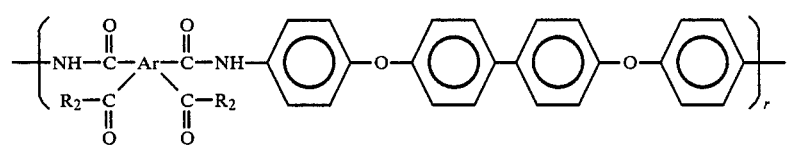

and

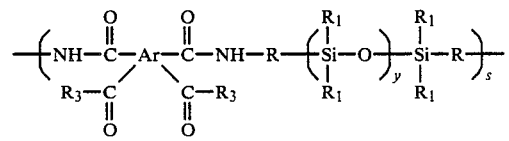

wherein Ar, R, and $R_1$ are as defined above; r and s are at least one; y is 1 to about 50; $R_2$ and $R_3$ are independently selected from halogen, —OH, and —$OR_4$; and $R_4$ is an alkyl group of 1 to 4 carbon atoms.

In another aspect, the compositions according to the invention also include the polyimides of Formula I and, in addition, one or more units of formula III, for example as in a blend or a copolymer.

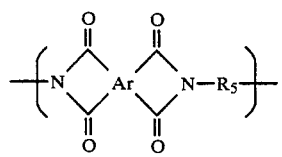

wherein $R_5$ is a divalent hydrocarbon radical which can be an aromatic or aliphatic moiety. Ar is as defined above.

R, $R_1$, $R_2$, $R_3$, $R_4$, and $R_5$ may be substituted or unsubstituted, for example, with an alkyl group of 1 to 4 carbon atoms or halogen. In order to provide a polymer with good processing properties, the ratio of m to n and r to s is preferably from about 1:1 to about 15:1.

The present invention also includes compositions which can comprise one or more of polyimides of Formula I, the polyamic acids of Formula II, or the polyimides of Formula III.

Briefly, the copolymers of this invention are useful in electronic applications and can be made into flexible substrates for electrical components, interlevel dielectrics, and the like. The polymers of the present invention provide a unique passivation coating for microelectronic uses. The polyamic acid coatings of the present invention can be wet-etched. The polyamic acid coatings are resistant to the photoresist solvents as well as to the solvents used to develop and remove the photoresist material. Further, the polyimides of the present invention provide a low modulus coating that can be used for any microelectronic application where a low modulus coating is desired. In particular, the tensile modulus of polyimides of this invention is typically between about 50,000 psi and about 250,000 psi. For example, Example 1 was found to be 129,000 psi.

The polyamic acid of the present invention is generally resistant to photoresist solvents (for example, propylene glycol monomethyl ether acetate, 2-ethoxyethyl acetate, and propylene glycol monomethyl ether) and developers which include basic aqueous solutions of tetramethylammonium hydroxide or sodium hydroxide. Further, the polyamic acid of the present invention can be etched by wet-etch solutions which can contain solvents such as triethanolamine, butanol, ethanol, and poly(vinylmethylether).

In greater detail, the aromatic moiety, Ar in Formulas I, II, and III, is characterized by a single aromatic ring or by two or more such rings which are fused together or are joined by one or more stable linkages, such as a covalent carbon-carbon bond, oxy, sulfonyl, carbonyl, alkylene, and the like. The aromatic moiety can include tetravalent radicals of benzene, naphthalene, phenanthrene, anthracene, and the like. Further, the aromatic rings can be unsubstituted or substituted, for example, with one or more lower alkyl groups.

Specific examples of suitable Ar moieties include

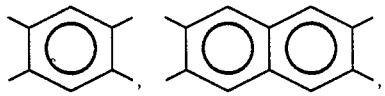

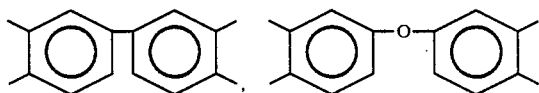

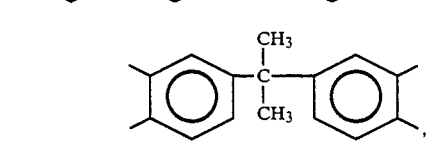

-continued

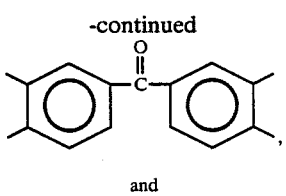

and

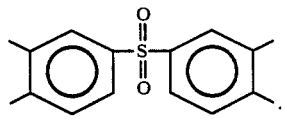

Best results have been attained with polyamides in which Ar is

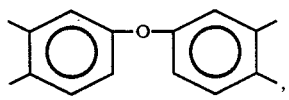

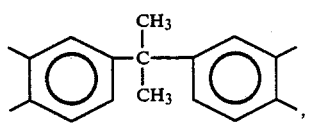

or

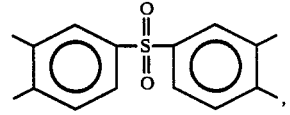

or a combination thereof.

The divalent hydrocarbon radical, R, in Formulas I and II, is an aliphatic moiety having 1 to about 15 carbon atoms and is characterized by a straight or branched-chain hydrocarbon such as, for example, methylene, ethylene, propylene, tetramethylene, hexamethylene, octamethylene, nonamethylene, decamethylene, dodecamethylene, and the like. Further, the divalent hydrocarbon radical can be unsubstituted or substituted with one or more halide or lower alkyl groups such as, for example, 2,2,4-trimethylhexamethylene, 2,2-dimethylpropylene, and the like.

The monovalent hydrocarbon radicals, $R_1$, in Formula I, as well as $R_2$ and $R_3$, in Formula II, individually can be aliphatic moieties or aryl moieties. Preferably, the aliphatic moieties have from 1 to about 10 carbon atoms and are characterized by a straight or branched-chain hydrocarbon such as, for example, methyl, ethyl, propyl, and the like. The aryl moieties preferably have from 6 to 20 carbon atoms and can include phenyl or substituted phenyl, such as para-methyl, and the like. Further, the monovalent hydrocarbon radicals can be unsubstituted or substituted with one or more halide or lower alkyl groups such as, for example, n-propyl, and the like.

The divalent hydrocarbon radical $R_5$, in Formula III, is an aromatic moiety or an aliphatic moiety. The aliphatic moiety preferably has from 1 to about 10 carbon atoms and is characterized by a straight or branched-chain hydrocarbon such as, for example, methyl, ethyl, propyl, and the like. The aromatic hydrocarbon moiety preferably has from 6 to about 30 carbon atoms and is characterized by a tetravalent or divalent radical as defined for Ar above. Further, $R_5$ can be unsubstituted or substituted with one or more halide or lower alkyl groups such as, for example, n-propyl, and the like.

The novel copolymers of the present invention can be prepared as the polycondensation product of components comprising 4,4'-bis(p-aminophenoxy)biphenyl, siloxane diamine, and aromatic dianhydrides or derivatives thereof.

Suitable aromatic dianhydrides useful in this invention include the dianhydrides of naphthalene, biphenyl (BPDA), diphenylether, benzophenone (BTDA), bis(3,4-carboxyphenyl)sulfone dianhydride (SPAN), 2,2-bis(3,4-dicarboxyphenyl)propane dianhydride (IPAN), pyromellitic dianhydride (PMDA), or bis-(3,4-dicarboxyphenyl)ether dianhydride (OPAN). Preferably, the dianhydrides are symmetrical. Preferred polyimides of this invention are made using the symmetrical dianhydrides OPAN, SPAN, and IPAN because the resulting polymers have an advantageous combination of good solvent resistance and low modulus.

The siloxane diamines useful in this invention include siloxane diamines having from 1 to about 40 disubstituted siloxyl units. Suitable siloxane diamines include bis-aminopropyl polydimethylsiloxane, bis-aminopropyl polydiethylsiloxane, bis-aminopropyl polydipropylsiloxane, diphenyl siloxanes, and the like.

The diamine component used in preparing the polyimides of the present invention can be 4,4'-bis(p-aminophenoxy)biphenyl (APBP) alone or a combination thereof with aliphatic diamines or other aromatic diamines Suitable aliphatic diamines contain from 2 to about 12 carbon atoms, e.g., ethylenediamine, trimethylenediamine, hexamethylenediamine, dodecamethylenediamine, and the like. In those cases where an aliphatic diamine containing from 3 to 12 carbon atoms comprises more than 10 to 50 weight percent of the amine, the reaction product has a lower melting point and/or higher solubility than product produced from all aromatic amines.

Suitable aromatic diamines which can be used in conjunction with 4,4'-bis(p-aminophenoxy)biphenyl (APBP) to form the polyimides of the present invention include metaphenylenediamine (MPDA), oxybisaniline, methylenebisaniline, 4,4'-aminodiphenylpropane, diaminodiphenylsulfide, 4,4'-diaminobenzophenone, toluenediamine, metaxylene diamine, etc. Generally, the 4,4'-bis(p-aminophenoxy)biphenyl (APBP) can range from about 1 mole percent to 95 mole percent, preferably at least 60 to 70 mol%, of the total diamines. For best results it is preferable to use only aromatic diamines since the thermal degradation properties of the polymers decrease when aliphatic diamines are employed.

The polyimides of the present invention are generally prepared in accordance with known polycondensation methods which are described in detail in Polyimides-Thermally Stable Polymers, Plenum Publishing (1987), incorporated herein by reference. The total diamine (APBP and siloxane diamine) and total dianhydride components are present in a ratio of approximately 1:1. However, by using an excess of diamine or dianhydride in the reaction mixture, (preferably ranging from about 0.98:1 to about 1.02:1) the chain length of the product can be adjusted. Further, the chain length can be restricted by adding a predetermined quantity of a monoamine or a monocarboxylic acid anhydride to the reaction mixture.

In somewhat greater detail, copolymers of this invention are preferably made by dissolving 4,4'-bis(p-aminophenoxy)biphenyl (APBP) in a polar aprotic solvent, such as NMP or N,N-dimethylacetamide, and adding the dianhydride and the siloxane diamine at a temperature between about 0° C. and 100° C., preferably in a range from about 10° C. to about 40° C., to make a solution of polyamic acid.

The resulting solution of polyamic acid can be diluted, if necessary, and spread on a substrate. The solvent can be evaporated and the coated substrate can be processed to wet-etch the polyamic acid before thermally curing the coating to fully imidize the polyamic acid. Imidization can be accomplished thermally, preferably at a temperature in a range from about 200° C. to about 400° C.

In general, any dilution of the polyamic acid solution with solvent, such as NMP, is based on the thickness requirement of the final coating, the viscosity and solids content of the solution, and the spin curve data for the polymer. Typically, solutions of the polyamic acid are applied to the substrate with solids concentrations from about 5 to about 50 weight percent, and preferably, from about 10 to about 40 weight percent. The spin curve data is obtained by spincoating the polymer onto the substrate at various spin speeds, measuring the resulting thickness and plotting thickness versus spin speed. Clean, dry, high-purity solvent may be used as the diluent. The diluted solution is generally pressure-filtered before further processing.

The polyamic acid solution can be applied either statically or dynamically. In static application, the polyamic acid solution is dispensed to a nonrotating substrate and spread across the surface by spinning. In dynamic application, the polyamic acid solution is dispensed to a rotating substrate. In either case, the substrate is spun at a spin speed which is determined from the spin curve for the final coating thickness required.

Typically, the polyamic acid is coated with a positive photoresist material. The photoresist material is then covered with a mask containing a pattern of vias (or openings) which are positioned where vias are desired in the polyamic acid coating. The photoresist material is then exposed to actinic radiation to convert it by photochemical reaction from an insoluble material to one that is soluble in basic aqueous developer solvents. Thus, photoresist material can be selectively removed to form vias that uncover the polyamic acid coating. The polyamic acid can now be selectively etched through the vias in the photoresist material. For a passivation coating application, this requires etching vias (or openings) through the polymer coatings to permit access for electrical connections between the substrate and the outside environment. These openings are typically 50 to 250 microns square.

Wet-etching chemically etches away the polyamic acid surfaces that are now exposed through the vias in the photoresist material. There are several methods that can be used to wet-etch the polyamic acid. For example, the polymer can be spray-etched. In the spray etch procedure, the polymer coated substrate is placed on a spin-coating device, and one, or possibly two spray sources (one for the etchant solution and one for a rinse) are directed at the polymer coated substrate. The coated substrate is first spun under a spray of etchant solution and then under a rinse spray.

The polyamic acid of the present invention can be wetetched with a composition containing an organic water soluble solvent such as methanol or ethanol, and a base which is strong enough to deprotonate the polyamic acid. The base can be either non-ionic, such as triethanolamine, or ionic, such as tetramethylammonium hydroxide (TMAH). Non-ionic base containing wet-etch solutions are described and claimed in application Ser. No. 491,438, filed on Mar. 9, 1990, incorporated herein by reference.

The remaining photoresist material, which formed the pattern over the polyamic acid coating, is flood exposed, developed, and removed with a developer such as aqueous sodium hydroxide. The photoresist material can be removed by the spray method described above, or the coated substrate can be immersed in the photoresist developer to strip the remaining photoresist material from the polyamic acid coating. Finally, the polyamic acid coating is imidized to form the polyimide coating. The imidization can be accomplished by heating at a temperature range of from about 200° C. to about 400° C.

The polyimides of the present invention can also be used as an interlayer dielectric insulating material. In this case, multiple layers of the polyimide of the present invention can be interspaced with inorganic material such as metal, or other conductive material.

The following examples will serve to illustrate certain embodiments of the herein disclosed invention. These examples should not, however, be construed as limiting the scope of the invention as there are many variations which may be made thereon without departing from the spirit of the disclosed invention, as those of skill in the art will recognize.

EXAMPLES

All percents used are weight percents.

In the following examples, the siloxane diamine component is bis-aminopropyl polydimethylsiloxane which, is commercially available from Chisso Corp. of Tokyo, Japan.

2,2-Bis(3,4-dicarboxyphenyl)propane dianhydride (IPAN), can be made according to the procedure described in U.S. Pat. No. 2,712,543, and bis(3,4-carboxyphenyl)sulfone dianhydride (SPAN) can be made according to the procedures described in U.S. Pat. Nos. 3,622,525, 3,106,568, and 3,022,320. 4,4'-Bis(p-aminophenoxy)biphenyl (APBP) is commercially available from Kennedy & Klim, Inc., Little Silver, N.J. Bis(3,4-dicarboxyphenyl)ether dianhydride (OPAN) and 4,4'-Diaminodiphenylether (OBA) are commercially available from Occidental Chemical Corp., Grand Island, N.Y.

Test procedures used to characterize the copolymers of this invention are as follows.

Modulus

Measurements of modulus were made as described in ASTM D882.

Dielectric Constant (E)

Measurements of dielectric constant were made on thin films (0.7 to 2 mils thick) cast from a solution of polyamic acid in NMP onto glass plates and thermally cured. The measurements were made using a two-fluid cell technique as described in ASTM D150. Testing was performed at approximately 23° C. and the results were recorded at a frequency of 1,000 KHz.

Moisture Absorption

A solution of polyamic acid in NMP was cast on glass and cured hr at 80° C., 1 hr at 200° C., and 1 hr at 300° C.) to form polyimide films approximately 50 microns thick. The resulting films were removed from the glass and cut to obtain samples of approximately 0.3 g. Dry weights were determined from films that had been dried in nitrogen for a minimum of 2 hours at 200° C. Moisture absorption was determined from films that had been placed into constant relative humidity chambers (56%, 77%, and 90% RH) and allowed to equilibrate for a period of six weeks. The film samples were then redried at 200° C. to verify the original dry weights.

Glass Transition Temperature (Tg)

The glass transition temperature (Tg) of the copolymer was measured by differential scanning calorimetry. A temperature heating rate of 20° C./min was used for all determinations.

Temperature of Onset of Degradation (TGA)

The temperature of onset of degradation (TGA) of the copolymer measured by thermogravimetric analysis in air or nitrogen. The onset temperature is the temperature at which 1 weight percent weight loss is found at a heating rate of 10° C./min (temperature range: 40° C. to 840° C.). Measurements were made on 10 mg samples.

Inherent Viscosity (IV)

Inherent Viscosity (IV) was determined at approximately 0.5 g/dl in at 25° C. as described in ASTM D2857.

Solution Viscosity

Solution viscosity was determined using a Brookfield Viscometer as described in ASTM D789-86.

Solvent Resistance

Solvent resistance was examined visually and by observation unr magnification. Evidence of solvent attack includes visible deterioration of the polymer surface such as cracking, cloudiness, or striations.

Example 1 a. Preparation of Polyamic Acid

Into a 100 mL water-jacketed resin kettle was added 3,3',4,4'-oxybisphthalic anhydride (OPAN) (3.614 g, 11.65 mmol), 4,4'-bis(p-aminophenoxy)-biphenyl (APBP) (3.034 g, 8.24 mmol), and a solvent system of 17.607 g of 2-methoxyethyl ether and 13.097 g of N-methylpyrrolidone (NMP). Bis-aminopropyl polydimethylsiloxane (3.353 g, 3.41 mmol) was then added to the mixture which was stirred for 48 hours at 45° C. under a nitrogen blanket to form a polymer having a siloxane diamine moiety content that corresponds to 33.5 weight percent of the polyamic acid and an inherent viscosity of 0.46 dl/g.

b. Preparation of Films

Films were prepared by solution casting the polymer on glass and curing (1 hr at 80° C., 1 hr at 200° C., and 1 hr at 300° C.) the polymer to a maximum temperature of 300° C. in a nitrogen atmosphere. The films were removed from the glass and modulus properties were measured. The one percent tensile secant modulus was approximately 129,000 psi.

c. Preparation of Coated Substrate

Approximately 3 mL of the polyamic acid containing solvent solution was dispensed onto 3 inch substrates and spun at 5,000 rpm for 30 seconds to yield a uniform coating which was soft cured in a nitrogen purged, recirculating oven for 10 minutes at 100° C. The coating thickness was approximately 5.0 micron.

A positive photoresist (sold under the trademark Shipley® 1813, available from Shipley, Newton, Mass.) was statically dispensed on the polymer coatings and spun at 4,000 rpm for 30 seconds. The silicon substrates, coated with polymer and photoresist, were soft baked in a recirculating oven for 10 minutes at 100° C. under nitrogen to give approximately a 1.3 micron thick polymer and photoresist coating.

The photoresist was exposed for 4 seconds on a mask aligner, 15 mW/cm$^2$ at 405 nm, spectral output range 350–450 nm. The photoresist was then developed in a tetramethyl ammonium hydroxide base developer (Shipley 312 developer diluted 1 part water/1 part developer).

d. Etching of Polyamic Acid Coated Substrate

The polyamic acid coating was chemically etched in a single wet solution bath of triethanolamine (167.2 g), butanol (190 g), ethanol (1330 g), and poly(vinylmethyl ether) (13.3 g of a 35% solution in water). The developer temperature was 21° C. and the etch time was 20 seconds. This corresponds to an etch time of approximately 0.25 micron per second.

The polyamic acid coated substrates were flood-exposed and the photoresist was stripped from the polyamic acid coating with a sodium hydroxide based developer was diluted 3 parts water/1 part developer (Shipley 351).

e. Imidization of Polyamic Acid to Polyimide

After photoresist stripping, the substrates were post-baked at 200° C. for 60 minutes and 300° C. for 60 minutes in a tube furnace to thermally imidize the polymer. Properties for this polymer are reported in Table I below.

f. Solvent Resistance

The patterned polymer coating did not crack, craze or display signs of solvent attack when immersed for approximately four minutes in a room temperature solution of N-methylpyrrolidone (NMP).

TABLE I

| | |
|---|---|
| Solution Viscosity | 5,920 cp* |
| Inherent Viscosity | 0.55 dl/g** |
| Tensile Modulus | 129,000 psi |
| Tg | 180–190° C. |
| TGA | 454° C. |
| Moisture Absorption | 0.21% |
| Dielectric Constant (E) | 3.022 |

*centipoise
**deciliters/gram

A low modulus is preferred for passivation coating applications. Many polymer systems display a tensile modulus that is higher than the polyimide of the present invention. For example, the following polymers (sold commercially by E.I. DuPont under the tradename Pyralin®) have reported values that are substantially higher than the polyimides of the present invention. It is believed that these polyimides are based on the following monomers:

| COMMERCIAL DESIGNATION | POLYMER | REPORTED TENSILE MODULUS (psi) |
|---|---|---|
| PI-2555 | BTDA/OBA/m-PDA | 348,000 |
| PI-2890D | 6FDA/OBA | 300,000 |
| PI-2610D | PMDA/BPDA | 1,200,000 | where 3,3'4,4'-benzophenone tetracarboxylic acid dianhydride is BTDA, 3,3'4,4'-tetracarboxybiphenyl dianhydride is BPDA, and m-phenylene diamine is m-PDA.

Example 2

Using OPAN (10.3 mmol, 3.196 g), APBP (5.4 mmol, 1.990 g), and aminopropyl polydimethylsiloxane (4.9 mmol, 4.814 g), Example 2 was prepared in a manner similar to Example 1 above to produce a polymer having a siloxane diamine moiety content that corresponds to approximately 48 weight percent of the polyamic acid. The IV was 0.34 dl/g and the solution viscosity was 1,430 cp.

Example 3

Using OPAN (13.4 mmol, 4.163 g), APBP (12.0 mmol, 4.409 g), and bis-aminopropyl polydimethylsiloxane (1.4 mmol, 1.428 g), Example 3 was prepared in a manner similar to Example 1 above to produce a polymer having a siloxane diamine moiety content that corresponds to approximately 14 weight percent of the the polyamic acid. The IV was 0.97 dl/g and the solution viscosity was 5,480 cp.

Example 4

Using IPAN (17.6 mmol, 5.692 g), APBP (12.1 mol, 4.271 g), and aminopropyl polydimethylsiloxane (5.6 mmol, 5.036 g), Example 4 was prepared in a manner similar to Example 1 above to produce a polymer having a siloxane diamine moiety content that corresponds to approximately 34 weight percent of the polyamic acid. The IV was 0.52 dl/g and the solution viscosity was 3,250 cp.

Example 5

Using SPAN (32.61 mmol, 11.683 g), APBP (22.33 mmol, 8.228 g), bis-aminopropyl polydimethylsiloxane (10.27 mmol, 10.088 g), Example 5 was prepared in a manner similar to Example 1 above to produce a polymer having a siloxane diamine moiety content that corresponds to approximately 34 weight percent of the polyamic acid. The IV was 0.37 dl/g and the solution viscosity was 1,870 cp.

Example 6

Using IPAN (19.4 mmol, 6.518 g), APBP (17.2 mmol, 6.336 g), and bis-aminopropyl polydimethylsiloxane (2.2 mmol, 2.145 g), Example 6 was prepared in a manner similar to Example 1 above to produce a polymer having a siloxane diamine moiety content that corresponds to approximately 14.3 weight percent of the polyamic acid.

Comparative Examples A-C

Using the appropriate amount of dianhydride, diamine, and bis-aminopropyl polydimethylsiloxane Comparative Examples A-C were prepared in a manner similar to Example 1 above. The stoichiometric weights and physical properties of Comparative Examples A-C are presented in Table II below.

TABLE II

| | Comparative Examples A-C | | | | |
|---|---|---|---|---|---|
| Example | Dianhydride (g) | Diamine (g) | Siloxane[1] (g) | IV (dl/g[2]) | Solution Viscosity (cp[3]) |
| A | OPAN (4.472) | OBA (2.210) | 3.318 | 0.44 | 3,640 |
| B | IPAN (4.608) | OBA (2.065) | 3.327 | 0.65 | 2,565 |
| C | OPAN (2.401) | zero | 7.600 | 0.09 | 40 |

[1]Siloxane diamine moiety
[2]Deciliters/gram
[3]Centipoise

To provide a comparison to Examples 1-6, Comparative Examples A-B were prepared using the aromatic diamine OBA rather than APBP, and Example C was prepared as an OPAN/siloxane diamine homopolymer.

Table III illustrates the solvent resistance and wet-etchability of the polymer composition. For the purposes of Table III, a polymer that is resistant to solvent attack (indicated as "yes") is one that does not undergo cracking, cloudiness, or striations on the polymer surface. In this case, the polyamic acid coated substrate was immersed in the solvent. A polymer that can be wet-etched is one that is dissolved by a wet-etch composition which does not itself attack the photoresist material.

TABLE III

| EXAMPLE NUMBER | POLYMER COMPOSITION | WEIGHT % SILOXANE[1] | RESISTANT TO SOLVENTS | | | Wet-Etch[5] |
|---|---|---|---|---|---|---|
| | | | X[2] | TMAH[3] | NaOH[4] | |
| 1 | OPAN/APBP/SILOXANE | 33.5 | yes | yes | yes | yes |
| 2 | OPAN/APBP/SILOXANE | 48 | yes | yes | yes | yes |
| 3 | OPAN/APBP/SILOXANE | 14 | yes | yes | yes | yes |
| 4 | IPAN/APBP/SILOXANE | 33.5 | yes | yes | yes | yes |
| 5 | SPAN/APBP/SILOXANE | 34 | yes | yes | yes | yes |
| 6 | IPAN/APBP/SILOXANE | 14.3 | yes | yes | yes | yes |
| A | OPAN/OBA/SILOXANE | 33 | yes | yes | no | N/A[6] |
| B | IPAN/OBA/SILOXANE | 33 | yes | yes | no | N/A |
| C | OPAN/ | 76 | no[7] | no | no | N/A |

TABLE III-continued

| EXAMPLE NUMBER | POLYMER COMPOSITION | WEIGHT % SILOXANE[1] | RESISTANT TO SOLVENTS | | | |
|---|---|---|---|---|---|---|
| | | | $X^2$ | TMAH[3] | NaOH[4] | Wet-Etch[5] |
| | SILOXANE | | | | | |

[1] Siloxane diamine moiety content that corresponds to approximately the weight percent found in the polyamic acid.

[2] X is the photoresist solvent used to apply the photoresist to the polyamic acid layer, in this case, Shipley 1813 photoresist in propylene glycol monomethyl ether acetate.

[3] An aqueous solution of tetramethylammonium hydroxide (TMAH) generally used to remove the portion of the photoresist material that was exposed to actinic radiation. Available commercially as Shipley 312.

[4] An aqueous solution of sodium hydroxide generally used to remove the portion of the photoresist material that was not exposed to actinic radiation from the polyamic acid coating. Available commercially as Shipley 351 (water/developer 3/1).

[5] The wet etch solution comprising triethanolamine, butanol, ethanol, and poly(vinylmethylether).

[6] In those cases where the polymer coating was dissolved and removed by the NaOH, the wet etch test could not be run (Comparative Examples A-C).

[7] Striations appeared on the polymer surface.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

What is claimed:

1. A polyimide composition comprising recurring units

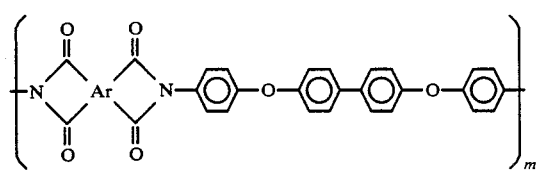

and

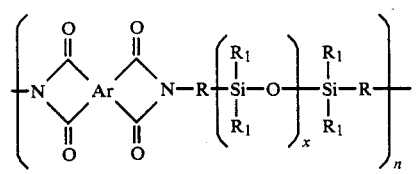

wherein Ar is at least one tetravalent aromatic nucleus; R is a divalent hydrocarbon radical; $R_1$ is a monovalent hydrocarbon radical; m and n are each at least one; and x is 1 to about 50.

2. The polyimide composition of claim 1 wherein Ar comprises at least one aromatic nucleus selected from the group consisting of

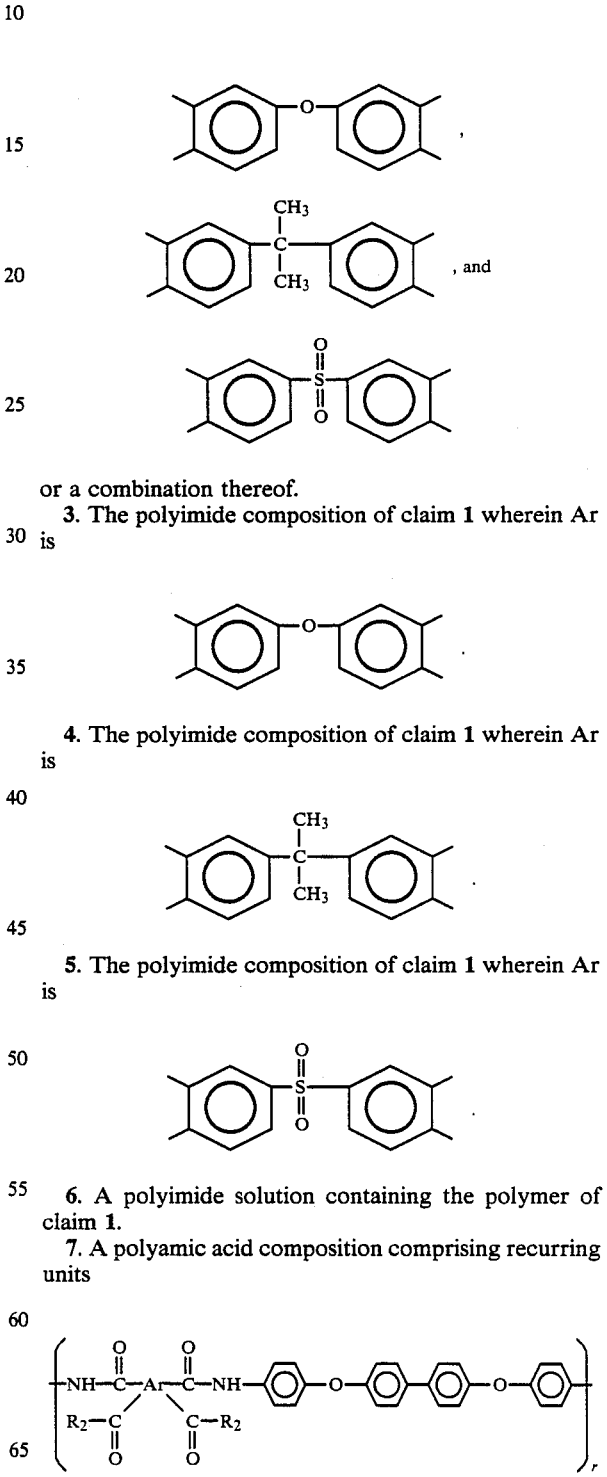

or a combination thereof.

3. The polyimide composition of claim 1 wherein Ar is

4. The polyimide composition of claim 1 wherein Ar is

5. The polyimide composition of claim 1 wherein Ar is

6. A polyimide solution containing the polymer of claim 1.

7. A polyamic acid composition comprising recurring units

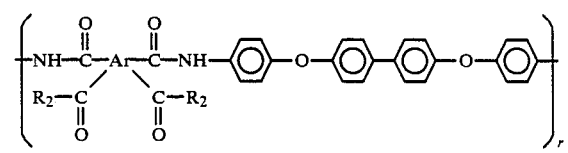

and

-continued

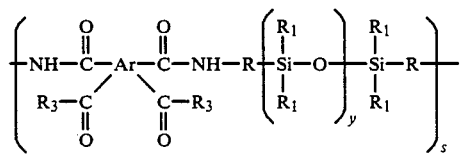

wherein Ar is at least one tetravalent aromatic nucleus; R is a divalent hydrocarbon radical; $R_2$ is a monovalent hydrocarbon radical; r and s are at least one; y is 1 to about 50; $R_2$ and $R_3$ are independently selected from halogen, —OH, and —$OR_4$; and $R_4$ is an alkyl group of 1 to 4 carbon atoms.

8. A polyamic acid solution containing the polyamic acid composition of claim 7.

9. A polyimide composition prepared by the reaction of 4,4'-bis(p-aminophenoxy)biphenyl moiety, a siloxane diamine moiety, and at least one dianhydride moiety.

10. The polyimide of claim 9 wherein the dianhydride moiety is selected from the group consisting of bis(3,4-carboxyphenyl)sulfone dianhydride (SPAN), 2,2-bis(3,4-dicarboxyphenyl)propane dianhydride (IPAN), and bis-(3,4-dicarboxyphenyl)ether dianhydride (OPAN).

* * * * *

UNITED STATES PATENT OFFICE
CERTIFICATE OF CORRECTION

Patent No. 4,960,846　　　　　　　　　　　Dated　October 2, 1990

Inventor(s)　Marvin J. Burgess, David A. Wargowski, Agnes M. Palka

It is certified that error appears in the above-identified patent and that said Letters Patent is hereby corrected as shown below:

| Column | Line | |
|---|---|---|
| Abstract | 2 | "useful electronic" should read --useful in electronic--. |
| 1 | 67 | "material The" should read --material.  The--. |
| 6 | 30-31 | "diamines Suitable" should read --diamines.  Suitable--. |
| 7 | 68 | "wetetched" should read --wet-etched--. |
| 9 | 4 | "cured hr" should read --cured (1 hr--. |
| 9 | 42 | "unr" should read --under--. |
| 9 | 47-48 | "Preparation of Polyamic Acid Into a 100 mL water-jacketed" should read --Preparation of Polyamic Acid Into a 100 mL water-jacketed--. |

Signed and Sealed this

Sixteenth Day of June, 1992

Attest:

DOUGLAS B. COMER

Attesting Officer　　　　Acting Commissioner of Patents and Trademarks